US012572687B2

(12) United States Patent
Hossain et al.

(10) Patent No.: US 12,572,687 B2
(45) Date of Patent: Mar. 10, 2026

(54) METHOD AND ELECTRONIC DEVICE FOR REMOVING SENSITIVE INFORMATION FROM IMAGE DATA

(71) Applicant: Samsung Electronics Co., Ltd., Suwon-si (KR)

(72) Inventors: Md. Imtiaz Hossain, Dacca (BD); Tahasin Mahmud, Dacca (BD); Aba Kowser, Dacca (BD)

(73) Assignee: Samsung Electronics Co., Ltd., Suwon-si (KR)

( * ) Notice: Subject to any disclaimer, the term of this patent is extended or adjusted under 35 U.S.C. 154(b) by 193 days.

(21) Appl. No.: 18/360,346

(22) Filed: Jul. 27, 2023

(65) Prior Publication Data

US 2024/0045992 A1    Feb. 8, 2024

(30) Foreign Application Priority Data

Aug. 3, 2022    (KR) ........................ 10-2022-0096742

(51) Int. Cl.
*G06F 21/62* (2013.01)
*G06T 11/60* (2006.01)
*G06V 10/25* (2022.01)
*G06V 10/44* (2022.01)

(52) U.S. Cl.
CPC .......... *G06F 21/6245* (2013.01); *G06T 11/60* (2013.01); *G06V 10/25* (2022.01); *G06V 10/44* (2022.01)

(58) Field of Classification Search
None
See application file for complete search history.

(56) References Cited

U.S. PATENT DOCUMENTS

| | | | |
|---|---|---|---|
| 10,235,603 B2 | 3/2019 | Zhang et al. | |
| 11,093,632 B1 | 8/2021 | Ton-That | |
| 2011/0202968 A1* | 8/2011 | Nurmi ..................... | G06F 21/10 726/1 |
| 2016/0048944 A1* | 2/2016 | Ashmole ............... | A61B 6/032 382/131 |
| 2019/0050592 A1* | 2/2019 | Grau ..................... | G06F 21/629 |
| 2019/0378607 A1* | 12/2019 | Chen ................... | G06F 21/6254 |

(Continued)

FOREIGN PATENT DOCUMENTS

| | | |
|---|---|---|
| CN | 112906047 A | 6/2021 |
| KR | 10-1795325 B1 | 11/2017 |
| KR | 10-2021-0067913 A | 6/2021 |

OTHER PUBLICATIONS

IEEE 14th International Conference on Machine Learning and Applications; Automated Detection of Adenoviral Conjunctivitis Disease from Facial Images using Machine Learning, 2015.

(Continued)

*Primary Examiner* — Joshua Joo
(74) *Attorney, Agent, or Firm* — Jefferson IP Law, LLP

(57) ABSTRACT

A method of removing sensitive information from image data by an electronic device is provided. The method includes obtaining first image data, determining whether the first image data includes at least one piece of sensitive information, when the first image data is determined as including the at least one piece of sensitive information, identifying a first area related to the at least one piece of sensitive information in the first image data, and generating second image data by modifying the first area.

18 Claims, 9 Drawing Sheets

(56)          References Cited

U.S. PATENT DOCUMENTS

| 2020/0121228 | A1  |  4/2020 | Taylor et al. |
| 2020/0327251 | A1* | 10/2020 | Martin-Lopez ....... H04L 9/0825 |
| 2021/0134436 | A1* |  5/2021 | Meyer .................... G16H 30/40 |
| 2022/0129582 | A1* |  4/2022 | Lange .................... G06T 11/00 |
| 2022/0383908 | A1* | 12/2022 | Mann .................... G06N 3/047 |
| 2022/0405425 | A1* | 12/2022 | Park ...................... G06T 7/0012 |
| 2023/0222757 | A1* |  7/2023 | Beith ................... H04W 12/02 |
|  |  |  | 382/103 |
| 2023/0306792 | A1* |  9/2023 | Vemulapalli ......... G06V 40/174 |
| 2024/0005036 | A1* |  1/2024 | Zhang ................ G06F 21/6254 |
| 2024/0054248 | A1* |  2/2024 | Dille ................... G06F 21/6254 |
| 2024/0320371 | A1* |  9/2024 | Maeda ................. G06V 40/161 |

OTHER PUBLICATIONS

M. Prashasthi et al.; Image Processing Approach to Diagnose Eye Diseases, 2017.
Medical Diagnosis of Cerebral Palsy Rehabilitation Using Eye Images in Machine Learning Techniques, Journal of Medical Systems, 2019.

* cited by examiner

FIG. 1C

METHOD AND ELECTRONIC DEVICE FOR REMOVING SENSITIVE INFORMATION FROM IMAGE DATA

CROSS-REFERENCE TO RELATED APPLICATION(S)

This application is based on and claims priority under 35 U.S.C. § 119(a) of a Korean patent application number 10-2022-0096742, filed on Aug. 3, 2022, in the Korean Intellectual Property Office, the disclosure of which is incorporated by reference herein in its entirety.

BACKGROUND

1. Field

The disclosure relates to a method and an electronic device for removing sensitive information from image data.

2. Description of Related Art

With the development of hardware and software of camera devices for photographing, users can obtain high-resolution images or video data. More particularly, the development of artificial intelligence technologies for image processing has facilitated automatic application of a particular filtering effect on an image, extraction of a particular object from an image, and classification of an object included in an image into a particular category.

Moreover, as personal devices, such as smartphones, or the like, are now commonly used and wireless communication technologies are developed, users may access a shared space, such as a social network service (SNS) page anytime and anywhere. As such, shared spaces have become activated, and users may share personal data, such as their images, voice, videos, or the like, with other users. Similarly, a user may easily access personal data of other users.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an electronic device for removing sensitive information from image data.

Additional aspects will be set forth in part in the description which follows and, in part, will be apparent from the description, or may be learned by practice of the presented embodiments.

The disclosure may be implemented in various forms, including a method, a system, a device, or a computer program stored in a computer-readable storage medium.

In accordance with an aspect of the disclosure, a method of removing sensitive information from image data by an electronic device is provided. The method includes obtaining first image data. In an embodiment of the disclosure, the method of removing sensitive information from image data by an electronic device includes determining whether the first image data includes at least one sensitive information, by using a sensitive information detection model configured to detect sensitive information. In an embodiment of the disclosure, the method of removing sensitive information from image data by an electronic device includes, when the first image data is determined as including the at least one sensitive information, identifying a first area related to the at least one sensitive information in the first image data based on the first image data and the sensitive information detection model. In an embodiment of the disclosure, the method of removing sensitive information from image data by an electronic device includes generating second image data by modifying the first area by using an image reconstruction model for image reconstruction.

In accordance with another aspect of the disclosure, an electronic device configured to remove sensitive information from image data is provided. The electronic device includes a memory storing at least one instruction, and at least one processor configured to execute the at least one instruction stored in the memory. In an embodiment of the disclosure, by executing the at least one instruction, the at least one processor obtains first image data. In an embodiment of the disclosure, by executing the at least one instruction, the at least one processor determines whether the first image data includes at least one sensitive information, by using a sensitive information detection model configured to detect sensitive information. In an embodiment of the disclosure, by executing the at least one instruction, the at least one processor, when the first image data is determined as including the at least one sensitive information, identifies a first area related to the at least one sensitive information in the first image data based on the first image data and the sensitive information detection model. In an embodiment of the disclosure, by executing the at least one instruction, the at least one processor generates second image data by modifying the first area by using an image reconstruction model for image reconstruction.

According to an embodiment of the disclosure, a program for performing, on a computer, the method of removing sensitive information from image data may be recorded on a computer-readable recording medium.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1C is a diagram illustrating a user stores image data according to an embodiment of the disclosure;

Throughout the drawings, it should be noted that like reference numbers are used to depict the same or similar elements, features, and structures.

DETAILED DESCRIPTION

Figure 1A:
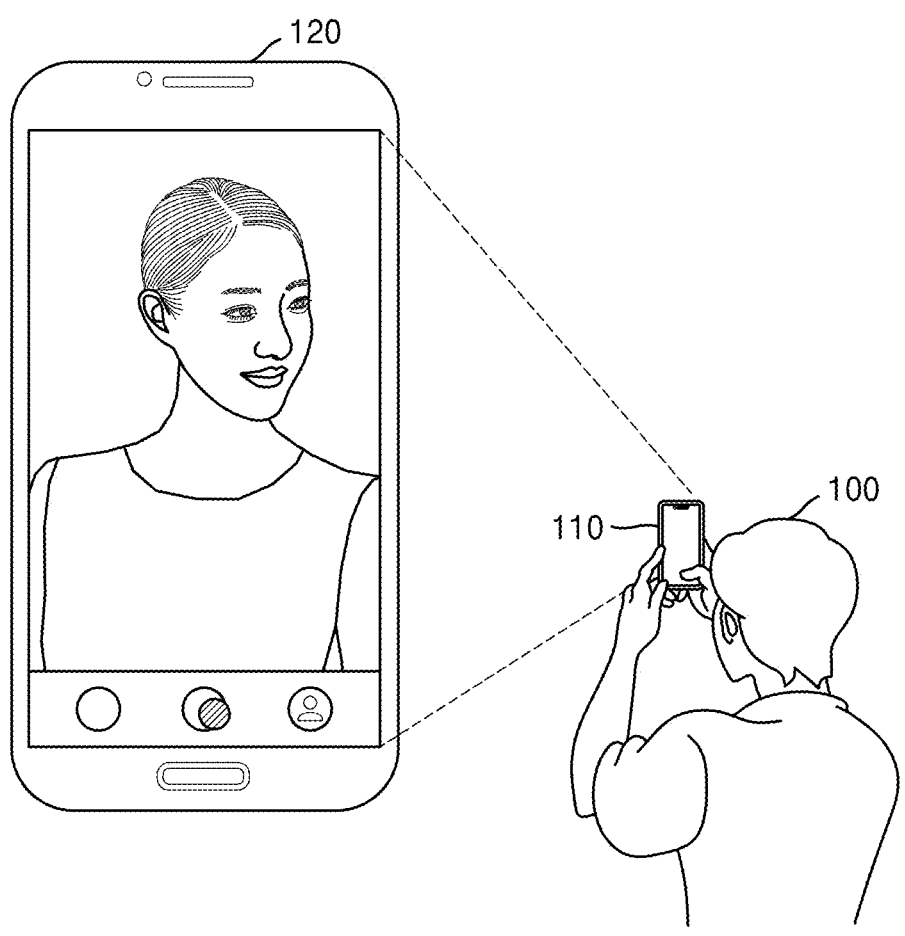
FIG. 1A is a diagram illustrating an electronic device obtains image data according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Before describing the disclosure in detail, terms used herein are defined or understood as below.

Throughout the specification, "sensitive information" may include information which should be legally or morally kept confidential from others, such as personal information of a user, or the like. Additionally, sensitive information may include information that a user intends to keep confidential from others. In an embodiment of the disclosure, sensitive information may refer to information which is not shown as an object in an image but may be detected by using the image. For example, sensitive information may include information that is not shown as an object, such as fingerprints, irises, or the like. For example, sensitive information may include emotions of a user (e.g., tension, fear, anger, or the like), and disease (e.g., cataract, or the like). For example, although an object of 'emotion' or an object of 'disease' is not included in an image, emotions and diseases may be determined from an image, and thus, may fall under sensitive information. As such sensitive information is not an object, feature points related to sensitive information may be scattered over the image.

Throughout the specification, "masking" may refer to changing a data value of a particular area. For example, masking may mean changing data of a particular area in an image while maintaining a format of the image file. For example, masking may refer to removing, filtering, or adding other data to data of a particular area. When an area including sensitive information is masked, the sensitive information may not be detected, but the masked area may appear to be different from the peripheral areas.

Throughout the specification, a "request" received by an electronic device may refer to an input value corresponding to a command to perform a particular operation by the electronic device. In an embodiment of the disclosure, a user may perform a user input such that an electronic device may perform a particular operation. An electronic device may receive a request that the performed user input through an input device and an input/output interface indicates and perform an operation according to the received request. For example, an electronic device may receive a request for removal of sensitive information and perform operations to remove sensitive information. In addition, when a user performs a user input regarding image sharing (e.g., an input of touching a share icon, or the like) through an input device, an electronic device may receive a request for sharing image data and perform operations to share the image data. The relation between a user input and a request may be preset. Similarly, the relation between a request and a command (or operation) may be prestored.

Throughout the specification, a "user interface" may refer to an interface for communication between a user and an electronic device. For example, a user may provide a request, control, command, or data to an electronic device through a user interface. Similarly, an electronic device may provide data to a user or request a user input through a user interface. A user interface may include various types of contents, such as images, texts, icons, or the like. In this regard, an "icon" may correspond to a preset request. For example, when a user selects a sharing icon included in a user interface, an electronic device may receive a request for sharing and perform operations for sharing.

Throughout the specification, the terms "first," "second," or "third" are only used to distinguish one component from another and are not intended to indicate orders of components. For example, a first frame does not necessarily mean a primary frame among a plurality of frames and may refer to a certain frame which is subject to removal of sensitive information.

Throughout the specification, a "photographing target" and a "target person" may refer to a person included in image data. On the other hand, a "user" may refer to a person who performs an input to an electronic device or is provided an output from an electronic device. Accordingly, a photographing target and a target person may be identical to or different from a user.

FIG. 1A is a diagram illustrating an electronic device obtains image data according to an embodiment of the disclosure.

Figure 1B:
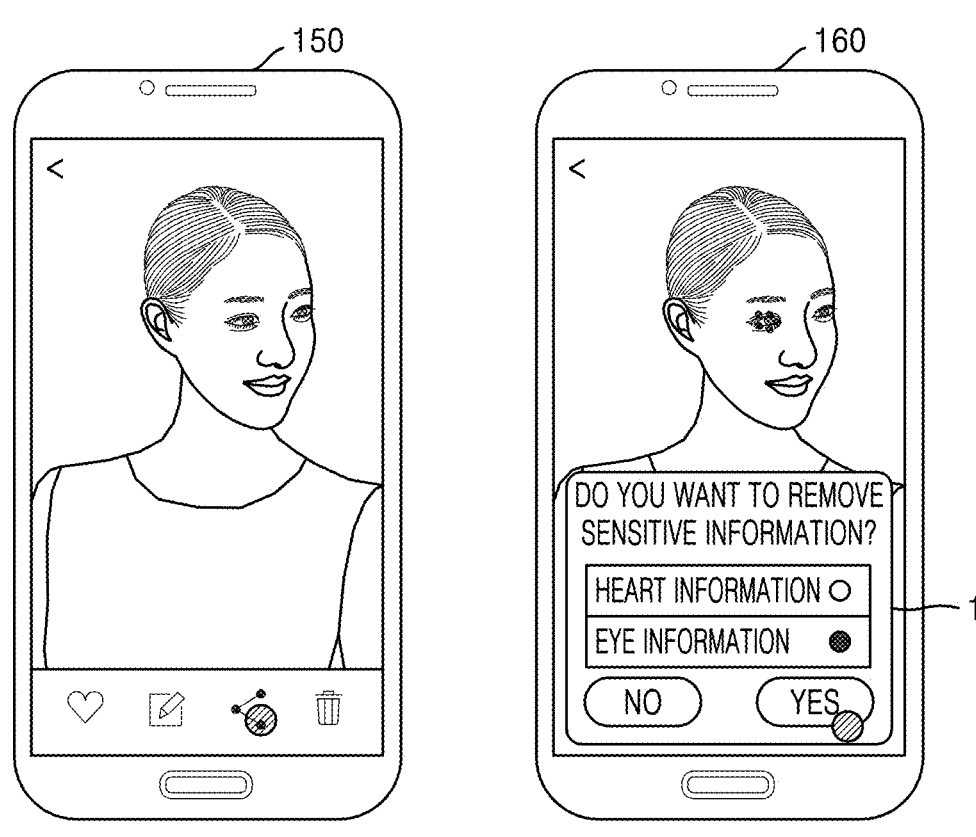
FIG. 1B is a diagram illustrating a user shares image data according to an embodiment of the disclosure.

FIG. 1B is a diagram illustrating a user shares image data according to an embodiment of the disclosure.

Figure 1C:
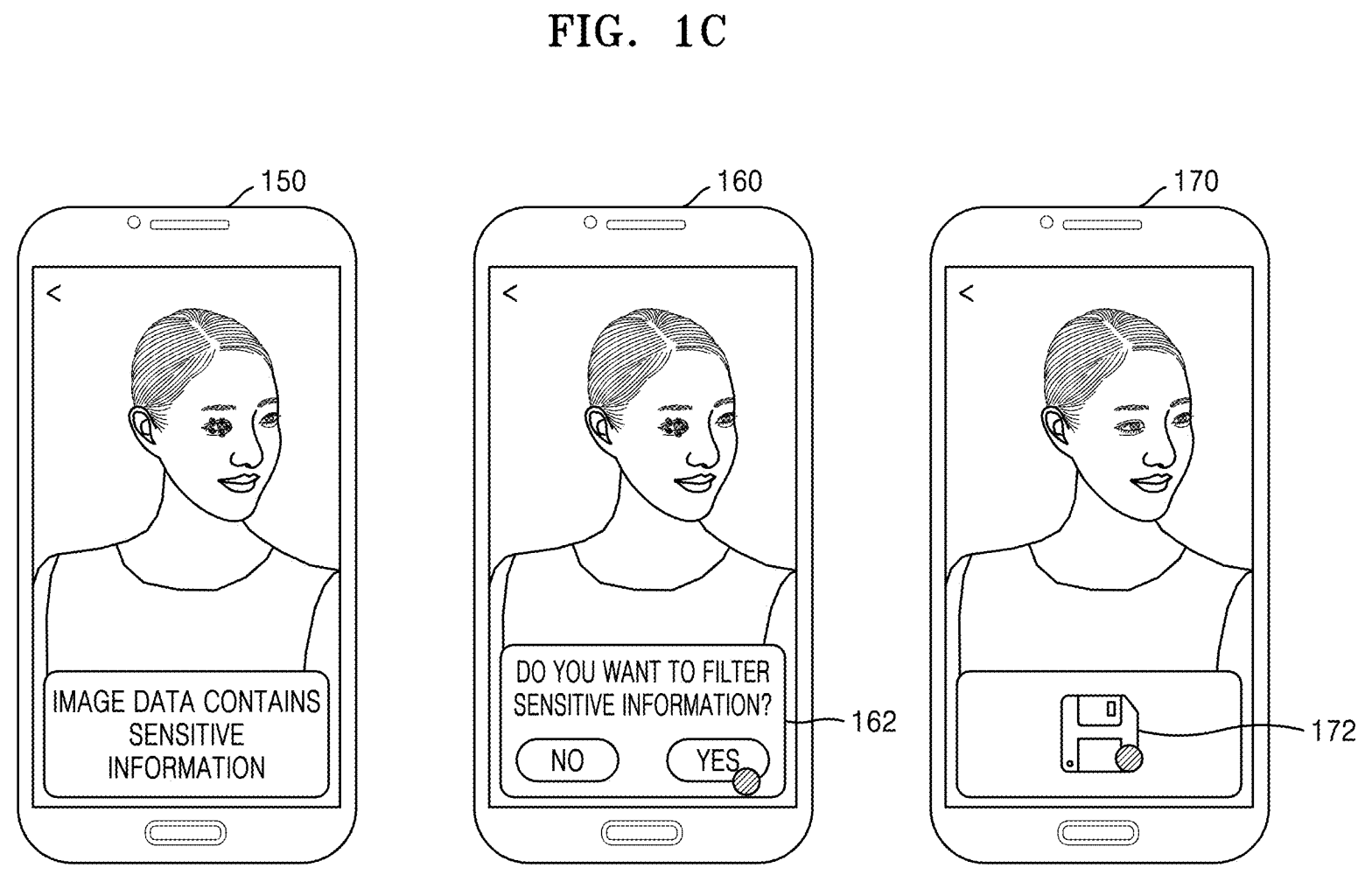

FIG. 1C is a diagram illustrating a user stores image data according to an embodiment of the disclosure.

FIGS. 1A, 1B, and 1C may show display outputs of an electronic device 110 illustrated in FIG. 1A, seen from different times. Slashed circles in FIGS. 1A, 1B, and 1C may show a user input (e.g., a touch input, or the like).

Referring to FIG. 1A, a user 100 may take a photograph by using a camera included in the electronic device 110 or connected to the electronic device 110. For example, the camera of the electronic device 110 may convert external light generated or reflected from a photographing target into an electrical image signal such that the electronic device 110 obtains image data about the photographing target. As shown in an output 120 in FIG. 1A, the electronic device 110 may output a user interface for photographing on a display.

When an input indicating a request for photographing is received from the user 100 through a user interface, the electronic device 110 obtains a live-view image shown on a display as image data. The obtained image data may be temporarily and/or permanently in a memory of the electronic device 110. Additionally or alternatively, the electronic device 110 may receive at least one image data from another electronic device, an external storage device, an external server, or an external system. The obtained image data may include sensitive information of a photographing target.

In an embodiment of the disclosure, sensitive information which is expressed as an object may be identified or extracted from the image data. For example, objects, such as fingerprints, irises, face moles, or the like, may be identified or extracted from the image data as the sensitive information. In an embodiment of the disclosure, sensitive information which is not expressed as an object may be identified or extracted from the image data. For example, emotion information or disease information may be identified or extracted from the image data.

When image data including sensitive information as described above is provided to another person or system, an issue regarding protection of personal information of the photographing target and security may arise. For example, the user 100 may share the image data on a social network service (SNS) page or store the image data in a cloud storage space. In this case, given the characteristics of the SNS page and cloud storage space, many other people may access the image data of the user, and there is a chance that other people may obtain the sensitive information from the image data of the user and use the sensitive information.

Referring to FIG. 1B, the user 100 may share the image data. For example, the user 100 may share the image data with another user through an external server or a system, such as an SNS, a messenger, or the like. In an embodiment of the disclosure, as shown in an output 130 in FIG. 1B, the electronic device 110 may provide a user interface including icons for processing of the image data. When a user input of selecting an icon for sharing among a plurality of icons is received, the electronic device 110 may receive a request for sharing of the image data.

In response to this, the electronic device 110 may determine whether the image data to be shared includes at least one piece of sensitive information. In an embodiment of the disclosure, the electronic device 110 may output a result of the sensitive information determination of the image data to be shared. For example, when the image data to be shared includes the sensitive information, the electronic device 110 may output at least one of contents of the sensitive information or the image data in which an area related to the sensitive information is marked. An area related to the sensitive information may refer to at least one feature point related to the sensitive information extracted from the image data.

Additionally or alternatively, the electronic device 110 may output a user interface 142 to request an input on whether to remove the sensitive information. When receiving a user input of selecting an icon for removal of the sensitive information, the electronic device 110 may receive a request for removal of the sensitive information from the image data. The electronic device 110 may generate image data in which the sensitive information is removed and perform operations for sharing the image data without the sensitive information.

The electronic device 110 may detect eye information and heart information from the image data of the user as the sensitive information. As shown in an output 140 in FIG. 1B, the electronic device 110 may output image data in which an area related to eye information and an area related to heart information are marked. In addition, the electronic device 110 may output texts, such as "eye information" and "heart information" respectively as contents of the sensitive information extracted from the image data. Moreover, the electronic device 110 may output the user interface 142 including icons for "yes" and "no" respectively for determining whether to remove the eye information and heart information.

Through the output 140, the user 100 may recognize the areas including the sensitive information in the image data and the contents of the sensitive information and determine whether to remove the sensitive information. In an embodiment of the disclosure, the electronic device 110 may receive a user input of selecting "eye information" from between "heart information" and "eye information" and a user input of selecting an icon "yes" indicating removal of the sensitive information. In response to the received user inputs, the electronic device 110 may generate image data from which the eye information is removed, and perform operations for sharing of the image data from which the eye information is removed. In this regard, the eye information may include eye health information. In addition, the heart information may include heart health information.

Referring to FIG. 1C, even when there is no further input after the image data is obtained, the electronic device 110 may determine whether the image data includes at least one piece of sensitive information. In an embodiment of the disclosure, the electronic device 110 may output a result of the sensitive information determination of the image data. For example, when the image data includes the sensitive information, as shown in an output 150 in FIG. 1C, the electronic device 110 may output image data in which an area related to the sensitive information is marked and a notice indicating that the image data includes the sensitive information. An area related to the sensitive information may refer to at least one feature point related to the sensitive information extracted from the image data.

In an embodiment of the disclosure, the electronic device 110 may output a user interface 162 to request an input on whether to remove, for example, filter, the sensitive information. As shown in an output 160 in FIG. 1C, the electronic device 110 may output the user interface 162 including icons for "yes" and "no" respectively for determining whether to remove the sensitive information. In an embodiment of the disclosure, when receiving a user input of selecting an icon "yes" for removal of the sensitive information, the electronic device 110 may receive a request for removal of the sensitive information from the image data.

In response to the received request, the electronic device 110 may generate image data from which the sensitive information is removed. In an embodiment of the disclosure, the electronic device 110 may output icons indicating processing of the image data from which the sensitive information is removed. For example, as shown in an output 170 in FIG. 1C, the electronic device 110 may output an icon 172 indicating a storage operation of the image data from which the sensitive information is removed.

When a user input signal of selecting the icon 172 indicating a storage operation is received, the electronic device 110 may receive a request for storage of the image data from which the sensitive information is removed. In response to the received request, the electronic device 110 may perform operations for storage of the image data from which the sensitive information is removed. For example, in response to the received request, the electronic device 110 may store the image data from which the sensitive information is removed in an external server or system, such as a cloud storage space, or the like.

The one or more embodiments of the disclosure described with reference to FIG. 1B may be applied to FIG. 1C, and the one or more embodiments of the disclosure described with reference to FIG. 1C may be applied to FIG. 1B. For example, the one or more embodiments of the disclosure described with reference to FIG. 1B which are applied to the process of sharing the image data may be applied to the storage process of the image data as well. Similarly, the one or more embodiments of the disclosure described with reference to FIG. 1C which are applied to the process of storing the image data may be applied to the sharing process of the image data as well. In addition, the one or more embodiments of the disclosure described with reference to FIGS. 1B and 1C may be applied in combination with each other.

FIG. 1B illustrates outputs of the electronic device 110 in order in the process of sharing the image data, and FIG. 1C illustrates outputs of the electronic device 110 in order in the process of storing the image data. However, the disclosure is not limited thereto. For example, in the process of sharing or storing the image data, the illustrated outputs (130, 140, 150, 160, 170) may be displayed in an order different from the described orders. Additionally or alternatively, some of the illustrated outputs (130, 140, 150, 160, 170) may be omitted or other outputs may be added thereto.

For example, when the user 100 sets up automatic removal of sensitive information, the electronic device 110 may perform the process of detecting and/or removing the sensitive information from the image data even without a separate user input for removal of the sensitive information. In addition, as illustrated in FIGS. 1B and 1C, the electronic device 110 may provide a user interface for determining whether to remove sensitive information after detecting the sensitive information from the image data; however, the disclosure is not limited thereto. For example, the electronic device 110 may provide in advance a user interface for determining whether to remove sensitive information before detecting the sensitive information. In this case, when receiving a user input requesting removal of the sensitive information, the electronic device 110 may perform the process of detecting and/or removing the sensitive information from the image data.

FIG. 1B illustrates an example in which the user 100 shares user's image data on an SNS page (e.g., a shared server or system), and FIG. 1C illustrates an example in which the user 100 stores the image data in a cloud storage space. However, the disclosure is not limited thereto. For example, even when the user 100 uploads the image data onto a space with poor security, or intends to use the image publicly, the one or more embodiments of the disclosure may still be applied.

Figure 2:
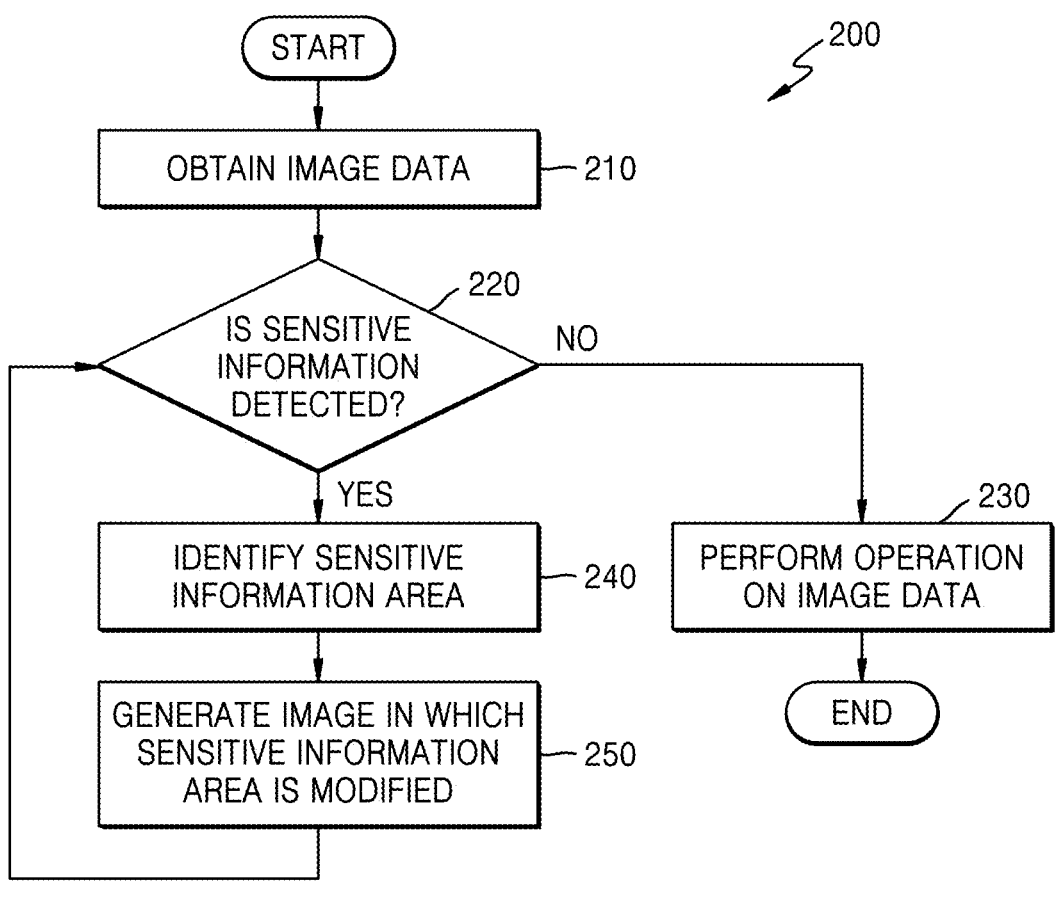
FIG. 2 is a flowchart illustrating a method of removing sensitive information from image data by an electronic device according to an embodiment of the disclosure.

FIG. 2 is a flowchart illustrating a method of removing sensitive information from image data by an electronic device according to an embodiment of the disclosure.

Referring to FIG. 2, a method 200 of removing sensitive information from image data by an electronic device (e.g., the electronic device 110 of FIG. 1A) may include operations 210 to 250. In one or more embodiments of the disclosure, the method 200 of removing sensitive information from image data by an electronic device is not limited to the description of FIG. 2, and any one of operations illustrated in FIG. 2 may be omitted or operations not shown in FIG. 2 may be further included. For example, the method 200 may further include operations of receiving, by an electronic device, a request corresponding to a user input and operations of outputting data by the electronic device.

In operation 210, the electronic device may obtain first image data. For example, the electronic device may receive image data input through a camera connected to or communicating with the electronic device. Additionally or alternatively, the electronic device may obtain the image data from a memory included in the electronic device or a storage device connected to or communicating with the electronic device. Additionally or alternatively, the electronic device may obtain the image data from a server and/or a system which are capable of communicating with the electronic device. The first image data may be image data to which any image processing has been applied. For example, the first image data may be an image to which a filtering process has been applied or from which any sensitive information has already been removed.

In operation 220, the electronic device may detect at least one piece of sensitive information from the first image data. In an embodiment of the disclosure, the electronic device may determine whether the first image data includes at least one piece of sensitive information by using a sensitive information detection model configured to detect sensitive information. For example, the electronic device may input the first image data to the sensitive information detection model and determine whether the first image data includes at least one piece of sensitive information according to a detection result output from the sensitive information detection model.

In an embodiment of the disclosure, the sensitive information detection model may include at least one artificial intelligence (AI) model trained to detect target sensitive information. For example, the sensitive information detection model may include an AI model trained to detect a cataract from the image data. For example, the sensitive information detection model may include an AI model trained to detect heart disease from the image data. In an embodiment of the disclosure, the sensitive information detection model may include an AI model trained to classify the image data. For example, the sensitive information detection model may include an AI model trained to classify emotions of a target person included in the image data into categories of happiness, fear, sadness, anger, or the like.

When at least one piece of sensitive information is not detected from the first image data, that is, the first image data is determined as not including at least one piece of sensitive information, in operation 230, the electronic device may perform a particular operation regarding the first image data. The particular operation may include preset operations. Additionally or alternatively, the particular operation may include operations according to a request corresponding to a user input.

On the other hand, when at least one piece of sensitive information is detected from the first image data, that is, the first image data is determined as including at least one piece of sensitive information, in operation 240, the electronic device may identify a first area related to the at least one piece of sensitive information in the first image data based on the first image data and the sensitive information detection model. The identified first area may include one or more areas.

In operation 250, the electronic device may generate second image data by modifying the first area by using an image reconstruction model for image reconstruction. For example, by modifying the first area by using the image reconstruction model, the electronic device may generate the second image data obtained by filtering at least one piece of sensitive information from the first image data.

In an embodiment of the disclosure, the electronic device may iterate operations 220 to 250 with the generated second image data. For example, the electronic device may determine whether the second image data includes at least one piece of sensitive information by using the sensitive information detection model. When the second image data is determined as not including at least one piece of sensitive information, the electronic device may perform a particular operation regarding the second image data. For example, the electronic device may perform sharing or storage of the second image data according to a request for sharing or storage of image data from a user.

On the other hand, when the second image data is determined as including at least one piece of sensitive information, the electronic device may identify a second area related to the at least one piece of sensitive information in the second image data based on the second image data and the sensitive information detection model. In an embodiment of the disclosure, the electronic device may generate third image data by modifying the second area by using the image reconstruction model. The second area may be identical to the aforementioned first area or completely or partially different from the aforementioned first area. The operations performed in the process of generating the second image data may be performed in the process of generating the third image data.

Even when the electronic device performs the process of removing sensitive information on an original image data (e.g., image data which has never gone through the sensitive information removal process), elements from which sensitive information may be detected may not be completely removed. The electronic device may iterate operations shown in FIG. 2 until no sensitive information is detected from the image data to more completely remove the sensitive information.

Figure 3:
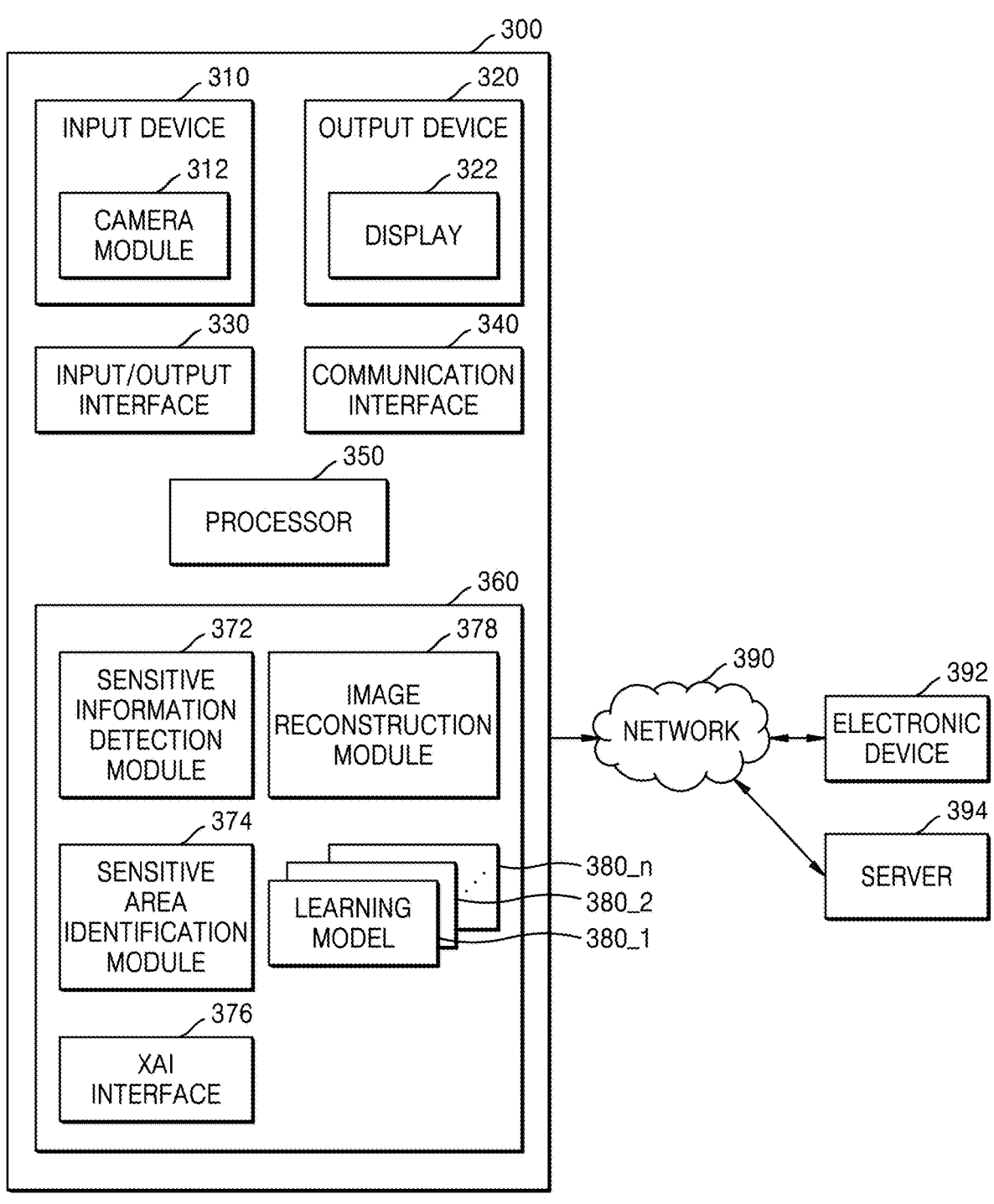
FIG. 3 is a block diagram of an electronic device according to an embodiment of the disclosure.

FIG. 3 is a block diagram of an electronic device according to an embodiment of the disclosure.

Referring to FIG. 3, an electronic device 300 may correspond to the electronic device 110 of FIG. 1A. The electronic device 300 may include a smartphone, a tablet personal computer (PC), a mobile phone, a smart watch, a desktop computer, a laptop computer, a notebook, smart glasses, a navigation device, a digital camera, a digital video recorder, a digital video player, a personal digital assistant (PDA), or the like. With reference to FIG. 3, the electronic device 300 may include an input device 310, an output device 320, an input/output interface 330, a communication interface 340, a processor 350, and a memory 360. According to an embodiment of the disclosure, the processor 350 may be referred to as at least one processor and understood as a component configured to control operations of other components of the electronic device 300. According to one or more embodiments of the disclosure, the electronic device 300 is not limited to the description of FIG. 3, and may further include components not shown in FIG. 3 or omit some of the components shown in FIG. 3.

The input device 310 may refer to an input tool to which a user inputs data to control the electronic device 300. For example, the input device 310 may include at least one of a key pad, a dome switch, a touch pad (capacitive type, resistive type, infrared-sensitive type, surface ultrasonic conductive type, integral tension measurement type, piezo effect type, or the like), a jog wheel, a jog switch, a microphone, a mouse, or a camera including an image sensor; however, the disclosure is not limited thereto.

The input device 310 may include a camera module 312 configured to generate image data. In an embodiment of the disclosure, the camera module 312 may include components required to generate image data by converting light generated or reflected from the photographing target into an electrical image signal. Additionally or alternatively, the camera module 312 may include components for pre-/post-processing of the image data. Additionally or alternatively, the camera module 312 may include components necessary for transmitting the image data into the electronic device 300.

The output device 320 may refer to a tool outputting data received by the electronic device 300 or data processed by the electronic device 300. The output device 320 may include a display 322 visually outputting data; however, the disclosure is not limited thereto. For example, the display 322 may output a graphical user interface (GUI) for photographing, a preview image, a live-view image, generated image data, a user interface for image data, or the like.

The input/output interface 330 may be a tool for interfacing with at least one of the input device 310 or the output device 320. In an embodiment of the disclosure, the input/output interface 330 may provide a request, a command, or data input through the input device 310 into the electronic device. In an embodiment of the disclosure, the input/output interface 330 may output a GUI, an image, a text, an icon, or the like, through the output device 320 based on a control, a command, a request, or data from the electronic device (e.g., the processor). For example, based on the command and data from the processor 350, the input/output interface 330 may constitute one or more contents, a layout of the contents, icons, or the like, and output them on the display 322.

Although the input device 310 and the output device 320 are described as being included in the electronic device 300 in FIG. 3, the disclosure is not limited thereto. For example, at least some of the input device 310 or the output device 320 may be an external device connected to or capable of communicating with the electronic device 300. In addition, FIG. 3 illustrates that the input device 310 and the output device 320 are separate devices. However, the disclosure is not limited thereto. For example, the input device 310 and the output device 320 may be a single device performing the input/output function. For example, the input device 310 and the output device 320 may be an integrated device having components and functions for performing both input and output, such as a touch screen, or the like.

The communication interface 340 may support establishment of a wired or wireless communication channel between the electronic device 300 and an external electronic device 392 or server 394 and communication through the established communication channel. According to an embodiment of the disclosure, the communication interface 340 may receive data from the external electronic device 392 or server 394 or transmit data to the external electronic device 392 or server 394 through wired or wireless communication. According to one or more embodiments of the disclosure, the communication interface 340 includes a wireless communication module (e.g., a cellular communication module, a short-range communication module, or a global navigation satellite system (GNSS) communication module) or a wired communication module (e.g., a local area network (LAN)

communication module or a power line communication module), and by using any one of the above communication modules, the communication interface 340 may communicate with the external electronic device 392 or server 394 through at least one network 390, for example, a local area communication network (e.g., Bluetooth, Wi-Fi direct, or infrared data association (IrDA)) or a long-distance communication network (e.g., a cellular network, Internet, or a computer network, such as LAN or wide area network (WAN)).

In an embodiment of the disclosure, the electronic device 300 may receive at least one image data from the electronic device 392 or server 394 through the network 390 and the communication interface 340. On the contrary, the electronic device 300 may transmit at least one image data (e.g., image data in which sensitive information is removed) to the electronic device 392 or server 394 through the network 390 and the communication interface 340. Additionally or alternatively, the electronic device 300 may receive one or more learning models from the electronic device 392 or server 394 through the network 390 and the communication interface 340.

The processor 350 may be electrically connected with the components included in the electronic device 300 and may perform calculation or data processing related to control of the components included in the electronic device 300 and/or communication. According to an embodiment of the disclosure, the processor 350 may load and process a request, a command, or data received from at least one of other components, and store the result data in the memory 360. According to one or more embodiments of the disclosure, the processor 350 may include at least one of a central processing unit (CPU), an application processor (AP), a graphics processing unit (GPU), or a neural processing unit (NPU). According to an embodiment of the disclosure, as the processor 350 executes at least one module, operations may be performed on the image data obtained by the camera module 312.

The memory 360 may be electrically connected to the processor 350 and may store at least one module, at least one learning model (380_1, 380_2, 380_n), a program, an instruction, or data related to operations of the components included in the electronic device 300. For example, the memory 360 may store at least one module, a learning model, a program, an instruction, or data for processing and control by the processor 350. The memory 360 may include at least one type of storage medium from among a flash memory type, a hard disk type, a multimedia card micro type memory, a card-type memory (for example, secure digital (SD) or extreme digital (XD) memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Referring to FIG. 3, the memory 360 may include a sensitive information detection module 372, a sensitive area identification module 374, an image reconstruction module 378, and at least one learning model (380_1, 380_2, 380_n). Modules or models included in the memory may be executed according to the control or command of the processor 350, and may include models or algorithms configured to perform operations for deriving output data for input data. At least some of the sensitive information detection module 372, the sensitive area identification module 374, or the image reconstruction module 378 included in the memory 360 may be implemented as a separate hardware module rather than a software module stored in the memory.

In an embodiment of the disclosure, the at least one learning model (380_1, 380_2, 380_n) stored in the memory 360 may be used to perform operations by each module. To this end, the memory 360 may include a plurality of weights constituting the at least one learning model (380_1, 380_2, 380_n). In this regard, the at least one learning model (380_1, 380_2, 380_n) may be a learning model trained based on a plurality of training data, and may be understood as a model based on at least one neural network. In one or more embodiments of the disclosure, the at least one neural network may include a deep neural network (DNN), and may also include an artificial neural network (ANN), a convolution neural network (CNN), a recurrent neural network (RNN), or the like, however, the disclosure is not limited thereto.

In an embodiment of the disclosure, the at least one learning model (380_1, 380_2, 380_n) may include at least one sensitive information detection model configured to detect at least one piece of sensitive information from the image data. For example, the at least one learning model (380_1, 380_2, 380_n) may include a model trained to detect particular disease information or particular emotion information as a sensitive information detection model. Additionally or alternatively, the at least one learning model (380_1, 380_2, 380_n) may include a classification model trained to classify input data into a plurality of categories (e.g., an emotion classification model) as a sensitive information detection model. The input data classified into the categories which fall under sensitive information among the plurality of categories may be determined as including sensitive information.

In an embodiment of the disclosure, the at least one learning model (380_1, 380_2, 380_n) may include an image reconstruction model trained for image reconstruction. For example, the at least one learning model (380_1, 380_2, 380_n) may include an image reconstruction model trained to reconstruct data in a masked area in the image data. For example, the image reconstruction model may be a model trained to predict data in a masked area based on at least some of data in the rest of areas other than the masked area (e.g., data around the masked area).

The at least one learning model (380_1, 380_2, 380_n) may be a learning model trained in the electronic device 300. Additionally or alternatively, the at least one learning model (380_1, 380_2, 380_n) may be a model trained in the electronic device 392 or server 394 and then loaded to the memory 360 or the processor 350 through the communication interface 340.

The electronic device 300 may receive a request input through the input device 310 and the input/output interface 330. A request may correspond to a command or data to be processed by the processor 350 according to a user input to the electronic device. Accordingly, when a request by a user input is received, the processor 350 of the electronic device 300 may perform an operation according to a command corresponding to the received request.

In an embodiment of the disclosure, the processor 350 may receive a request for removal of at least one piece of sensitive information from the image data input through the input device 310 and the input/output interface 330. In response to this, the processor 350 may perform operations for removing the at least one piece of sensitive information from the image data. In an embodiment of the disclosure, the processor 350 may receive a request for sharing or storage of the image data input through the input device 310 and the input/output interface 330. In response to this, the processor 350 may perform operations for sharing or storing the image data.

The electronic device 300 may obtain first image data input through the camera module 312. To this end, the camera module 312 may be executed by the processor 350 to perform photographing operations for generation of the image data. Additionally or alternatively, the electronic device 300 may obtain the first image data from the electronic device 392 or server 394.

After the first image data is obtained, the sensitive information detection module 372 may be executed by the processor 350 to determine whether the first image data includes at least one piece of sensitive information. For example, the sensitive information detection module 372 may determine whether the first image data includes at least one piece of sensitive information by using the sensitive information detection model among the learning models (380_1, 380_2, 380_n). When the first image data is determined as including sensitive information, the sensitive area identification module 374 may be executed by the processor 350.

The sensitive area identification module 374 may identify a first area related to the at least one piece of sensitive information in the first image data based on the first image data and the sensitive information detection model. In an embodiment of the disclosure, the sensitive area identification module 374 may extract at least one feature point related to the at least one piece of sensitive information in the first image data based on the first image data and the sensitive information detection model. The sensitive area identification module 374 may determine the first area related to the sensitive information based on the extracted at least one feature point.

In an embodiment of the disclosure, the memory 360 may include an eXplainable Artificial Intelligence (XAI) interface 376. The XAI interface 376 may show an area related to the sensitive information in the image data and output the same on the display 322. Additionally or alternatively, the XAI interface 376 may output contents of the sensitive information included in the image data on the display 322. Additionally or alternatively, the XAI interface 376 may output a user interface including at least one icon for determining whether to remove the sensitive information on the display 322.

The image reconstruction module 378 may be executed by the processor 350. The image reconstruction module 378 may generate second image data by modifying the first area in the first image data. To this end, the image reconstruction module 378 may use an image reconstruction model among the learning models (380_1, 380_2, 380_n). In an embodiment of the disclosure, the image reconstruction module 378 may mask the first area in the first image data and generate the second image data based on the first image data with the masked first area by using the image reconstruction model.

Figure 4:
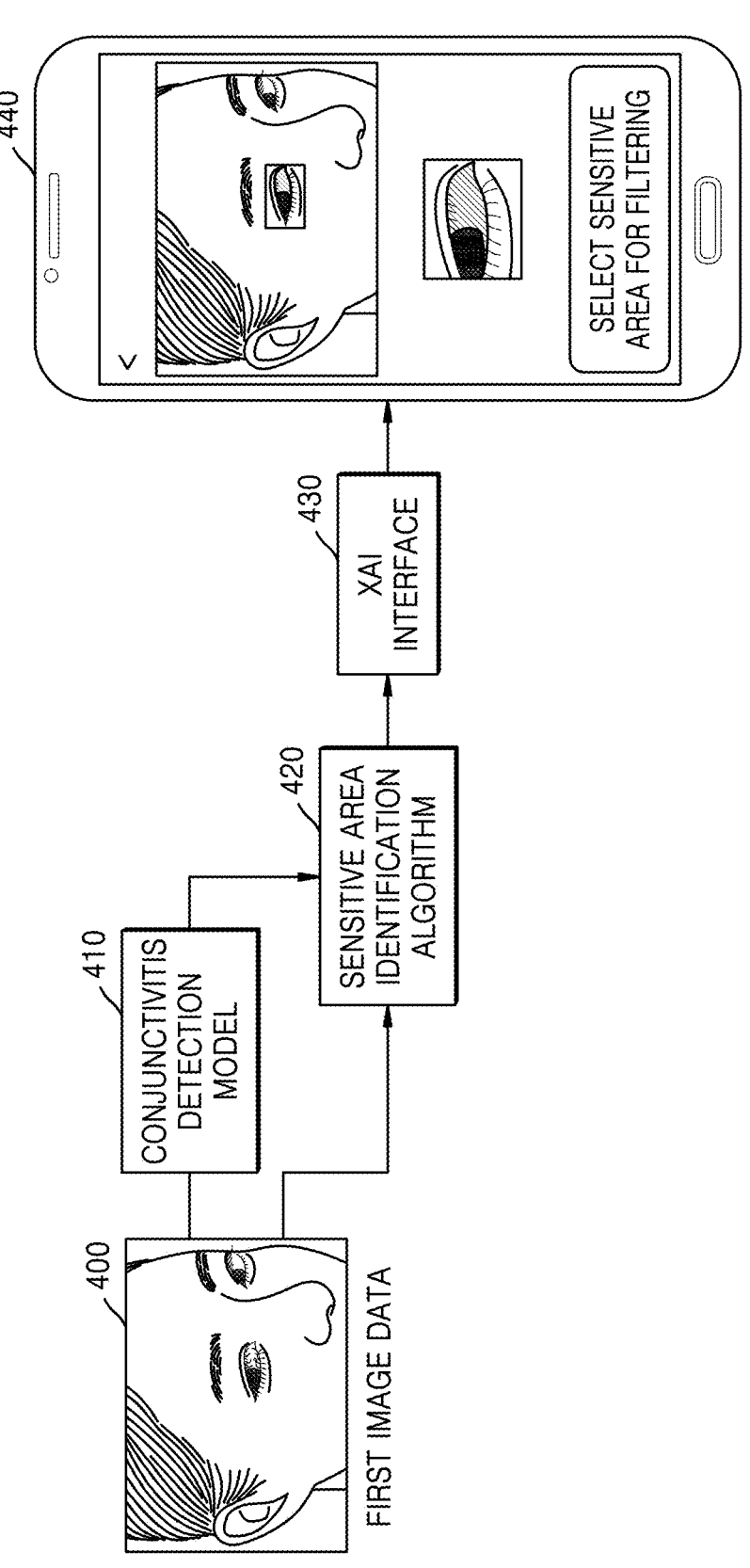
FIG. 4 is a diagram illustrating conjunctivitis information being detected from image data and output according to an embodiment of the disclosure.

FIG. 4 is a diagram illustrating conjunctivitis information being detected from image data and output according to an embodiment of the disclosure.

Referring to FIG. 4, first image data 400 obtained by a processor (e.g., the processor of FIG. 3) may be an image at least partially showing an outer shape of a target person. In an embodiment of the disclosure, the processor may obtain the first image data 400 and determine whether the first image data 400 includes conjunctivitis information. For example, the processor may determine whether the target person included in the first image data 400 has conjunctivitis. To this end, a sensitive information detection model trained to detect conjunctivitis from an input image (hereinafter, conjunctivitis detection model) may be used. With reference to FIG. 4, the processor may input the first image data 400 to a conjunctivitis detection model 410 to obtain a conjunctivitis detection result for the first image data 400 from an output of the conjunctivitis detection model 410 and determine whether the first image data 400 includes conjunctivitis information.

When the first image data 400 is determined as including conjunctivitis information, the processor may identify an area related to the conjunctivitis information in the first image data 400 based on the first image data 400 and the conjunctivitis detection model 410. In an embodiment of the disclosure, the processor may extract at least one feature point related to conjunctivitis information in the first image data 400 based on the first image data 400 and the conjunctivitis detection model 410. For example, the processor may extract, among a plurality of pixels included in the first image data 400, pixels which have contributed to the conjunctivitis detection results as the at least one feature point.

In an embodiment of the disclosure, the processor may determine an area including at least some of a plurality of feature points as an area related to the sensitive information. For example, the processor may determine an area having a feature point density that is higher than a reference density as an area related to the sensitive information. For example, the processor may determine a closed curve area including all of the feature points as an area related to the sensitive information.

Referring to FIG. 4, the processor may identify an area related to the conjunctivitis information based on the conjunctivitis detection model 410 and the first image data 400 according to a sensitive area identification algorithm 420 for identifying a sensitive area. In an embodiment of the disclosure, the sensitive area identification algorithm 420 may be an algorithm used in calculating contribution of pixels included in an input image to output data in an explainable artificial intelligence model. For example, the sensitive area identification algorithm 420 may include an equation or a processing procedure configured to calculate contribution based on a plurality of pixels included in the image data and weights of each layer of a sensitive information detection model. In FIG. 4, the sensitive area identification algorithm 420 may be an algorithm configured to calculate contribution of each of the plurality of pixels included in the image data to the conjunctivitis detection result.

For example, the processor may generate a plurality of pixel groups including a first pixel according to the sensitive area identification algorithm 420. The processor may obtain a plurality of output data of the conjunctivitis detection model 410 for the first image data from which each of the plurality of pixel groups is removed. The processor may compare the obtained plurality of output data and the conjunctivitis detection result for the first image data 400 to calculate contribution of the first pixel. The processor may determine at least some of the plurality of pixels of the first image data 400 as at least one feature point related to conjunctivitis according to the calculated contribution.

According to the aforementioned algorithm, the processor may extract from the first image data 400 red pixels in the eye area, which have a great contribution to the conjunctivitis detection result, as at least one feature point related to conjunctivitis. In an embodiment of the disclosure, the processor may identify an area including one or more feature points (e.g., the white area of eye) as an area related to conjunctivitis. Additionally or alternatively, the sensitive area identification algorithm 420 may include an AI model trained to identify an area related to the conjunctivitis information based on the first image data and the conjunctivitis detection result.

The processor may provide to an XAI interface 430 (e.g., the XAI interface of FIG. 3) at least some of output data of each process, such as an identified area, a conjunctivitis detection result, or the like. The processor may output the conjunctivitis information of the first image data 400 on a display through the XAI interface 430. In an embodiment of the disclosure, the XAI interface 430 may mark an area related to conjunctivitis on the first image data 400 and output the same on a display. Accordingly, the user may visually recognize types and areas of the sensitive information in the first image data 400.

As shown in an output 440 of FIG. 4, the processor may control the XAI interface 430 to mark an area related to conjunctivitis with slashes on the first image data 400 and output the same on a display. The area related to sensitive information is marked with slashes in FIG. 4. However, the disclosure is not limited thereto. For example, the area related to the sensitive information may be marked with a particular pattern, a particular line, a particular shape, a particular color, or the like.

Additionally or alternatively, the XAI interface 430 may be executed by the processor to output an image in which an area related to the sensitive information is enlarged. Accordingly, a user may recognize an area from which sensitive information is able to be detected (or identified) in the first image data 400. Additionally or alternatively, the XAI interface 430 may output a user interface for determining whether to remove conjunctivitis information from the first image data 400.

The conjunctivitis detection model 410 of FIG. 4 may be included in the learning models (380_1, 380_2, 380_*n*) of FIG. 3, and may be used by the sensitive information detection module 372 of FIG. 3 to detect sensitive information. In addition, the sensitive area identification algorithm 420 of FIG. 4 may be used by the sensitive area identification module 374 to identify a sensitive area in the image data.

Figure 5:
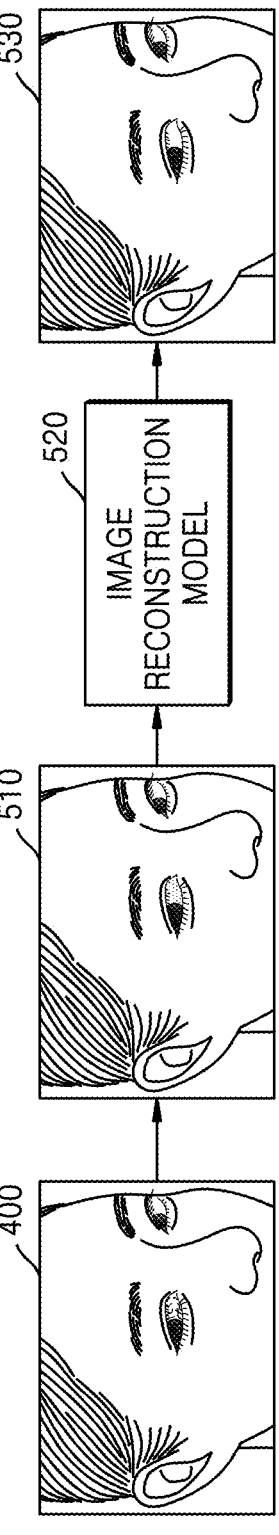
FIG. 5 is a diagram illustrating image data from which conjunctivitis information is removed being generated according to an embodiment of the disclosure.

FIG. 5 is a diagram illustrating image data from which conjunctivitis information is removed being generated according to an embodiment of the disclosure.

FIG. 5 illustrates processes after FIG. 4. Based on a user input to icons included in an output user interface, a processor (e.g., the processor of FIG. 3) may perform a request, a command, or operations corresponding to the user input. In an embodiment of the disclosure, when receiving a user input of selecting an area to be removed among one or more areas, the processor may perform a process for removing the sensitive information on the selected area.

To remove the conjunctivitis information, the processor may mask an area related to the conjunctivitis information in the first image data 400. For example, the processor may mask an area to be removed (e.g., white area in eye) in the first image data 400. In an embodiment of the disclosure, the processor may generate second image data 530 in which the white area of eye is modified based on a masked first image data 510, by using an image reconstruction model 520 for image reconstruction. For example, the processor may generate the second image data 530 in which the white area of eye is modified by generating data of masked area by using the image reconstruction model 520.

In an embodiment of the disclosure, the area related to the sensitive information may correspond to at least one feature point related to the sensitive information. In this case, the processor may generate the second image data 530 by masking an area on a feature-point basis instead of masking a wide area in the first image data. In such a case, loss of original data may be minimized, and a more natural image may be generated, compared to the case in which a particular object area is modified in image data.

The image reconstruction model 520 used for image reconstruction may be a generative adversarial network (GAN) model. However, the disclosure is not limited thereto, and the image reconstruction model 520 may be an AI model trained to generate a masked area based on data of other areas (e.g., data of peripheral areas). Accordingly, a user may obtain an image with the sensitive information removed therefrom, which is still natural and complete, instead of an image in which areas related to the sensitive information are simply removed.

In an embodiment of the disclosure, when the area related to the sensitive information includes a plurality of areas, the processor may receive a request for removal of sensitive information in at least some of the plurality of areas. For example, when the area related to the conjunctivitis information is both of left eye area and the right eye area, the processor may receive a request for removal of sensitive information in the left eye area. In this case, the processor may perform operations for removing the sensitive information only from the left eye area.

In an embodiment of the disclosure, the processor may detect a plurality of sensitive information. In this case, the processor may identify an area related to first sensitive information among the plurality of sensitive information. Similarly, the processor may identify an area related to second sensitive information among the plurality of sensitive information. When receiving a user input for removing the first sensitive information, the processor may receive a request for removal of the first sensitive information and perform an operation for removing the sensitive information on the area related to the first sensitive information.

The image reconstruction model 520 of FIG. 5 may be included in the learning models (380_1, 380_2, 380_*n*) of FIG. 3, and may be used by the image reconstruction module 378 of FIG. 3 to generate image data in which an area related to the sensitive information is modified. FIGS. 4 and 5 illustrate the conjunctivitis information as an example of sensitive information. However, the disclosure is not limited thereto, and one or more embodiments of the disclosure described with reference to FIGS. 4 and 5 may be applied to other types of sensitive information as well.

Figure 6:
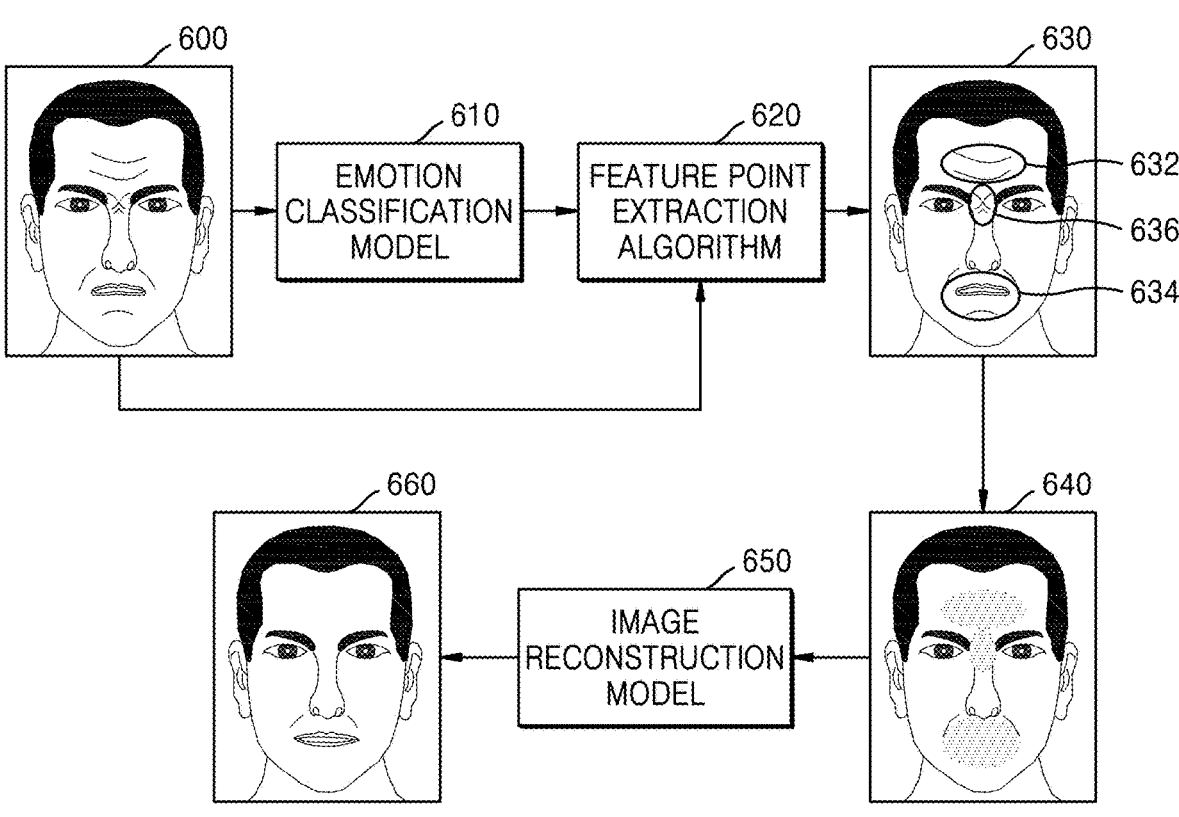
FIG. 6 is a diagram illustrating emotion information being detected and removed from image data according to an embodiment of the disclosure.

FIG. 6 is a diagram illustrating emotion information being detected and removed from image data according to an embodiment of the disclosure.

Referring to FIG. 6, in an embodiment of the disclosure, a processor (e.g., the processor of FIG. 3) may determine whether first image data 600 includes sensitive information by using a sensitive information detection model configured to detect sensitive information. The sensitive information detection model used for detection of sensitive information may be a classification model trained to classify input data into at least one of a plurality of categories. At least some of the plurality of categories may fall under the sensitive information. Accordingly, the input data classified into the categories which fall under sensitive information by the classification model may be determined as including sensitive information.

Referring to FIG. 6, the processor may input the first image data 600 to an emotion classification model 610 configured to classify emotions and determine an emotion of target person included in the first image data 600 as at least one of a plurality of emotions. The processor may determine whether the determined emotion of target person falls under the sensitive information. Among a plurality of emotions, an emotion falling under the sensitive information may be preset. For example, when the emotion information "anger" is set to fall under the sensitive information, the image data for which emotion is classified as "anger" may be determined as including the sensitive information.

The processor may identify an area which has contributed to classification of the image data as certain emotion information based on the first image data 600, the emotion classification model 610, and/or the emotion classification result. In an embodiment of the disclosure, the processor may extract at least one feature point which has contributed to classification of the image data as including certain emotion information by using a feature point extraction algorithm 620 for extracting a feature point. The feature point extraction algorithm 620 may include an algorithm, a calculation, or a model used to extract a feature point in an explainable artificial intelligence model (e.g., LIME, SHAP).

For example, the processor may calculate a contribution to emotion information "anger" of each of a plurality of pixels included in the image data according to the feature point extraction algorithm 620 and extract at least one feature point based on the calculated contribution. In FIG. 6, pixels in a forehead area 632, pixels in a mouth area 634, and pixels in an area 636 between eyebrows which have contributed to identification of emotion information "anger", may be extracted as feature points related to the emotion information "anger." As shown in an image 630 in FIG. 6, the processor may determine the forehead area 632, the mouth area 634, and the area 636 between eyebrows, which include at least some of the extracted feature points, as areas related to the emotion information "anger."

As shown in an image 640 in FIG. 6, the processor may mask the forehead area 632, the mouth area 634, and the area 636 between eyebrows, which are areas related to the emotion information "anger. The processor may input a masked image 640 to an image reconstruction model 650 (e.g., the image reconstruction model of FIG. to generate new data for the masked areas. For example, to remove the emotion information "anger" from the first image data 600, the processor may generate second image data 660 by modifying the areas related to the emotion information "anger." Accordingly, the processor may generate image data including a shape of a person having a forehead, a mouth, and a middle area between eyebrows but without the emotion information of anger. For example, in this manner, a more natural and flawless image may be generated, compared to the cases where areas related to the sensitive information are simply removed or noise is added to the areas.

The processor may generate image data from which no sensitive information is detected, i.e., in which sensitive information is removed, by iterating the aforementioned process with respect to the generated second image data 660. Accordingly, the processor may generate image data from which the emotion of anger cannot be detected, that is, in which the emotion information "anger" is removed. According to a request corresponding to a user input, the generated image data may be transmitted to other electronic device, server, or system and then shared or stored.

The emotion classification model 610 of FIG. 6 may be included in the sensitive information detection model, and the feature point extraction algorithm 620 may be included in the sensitive area identification algorithm. Accordingly, the emotion classification model 610 may be included in the learning models of FIG. 3, and may be used by the sensitive information detection module of FIG. 3. In addition, the feature point extraction algorithm 620 may be used by the sensitive area identification module of FIG. 3.

FIG. 6 illustrates the emotion information as an example of sensitive information; however, the disclosure is not limited thereto, and one or more embodiments of the disclosure described with reference to FIG. 6 may be applied to other types of sensitive information as well. FIGS. 5 and 6 mark the masked areas with dotted areas to distinguish the masked areas from other areas; however, the disclosure is not limited thereto.

Figure 7:
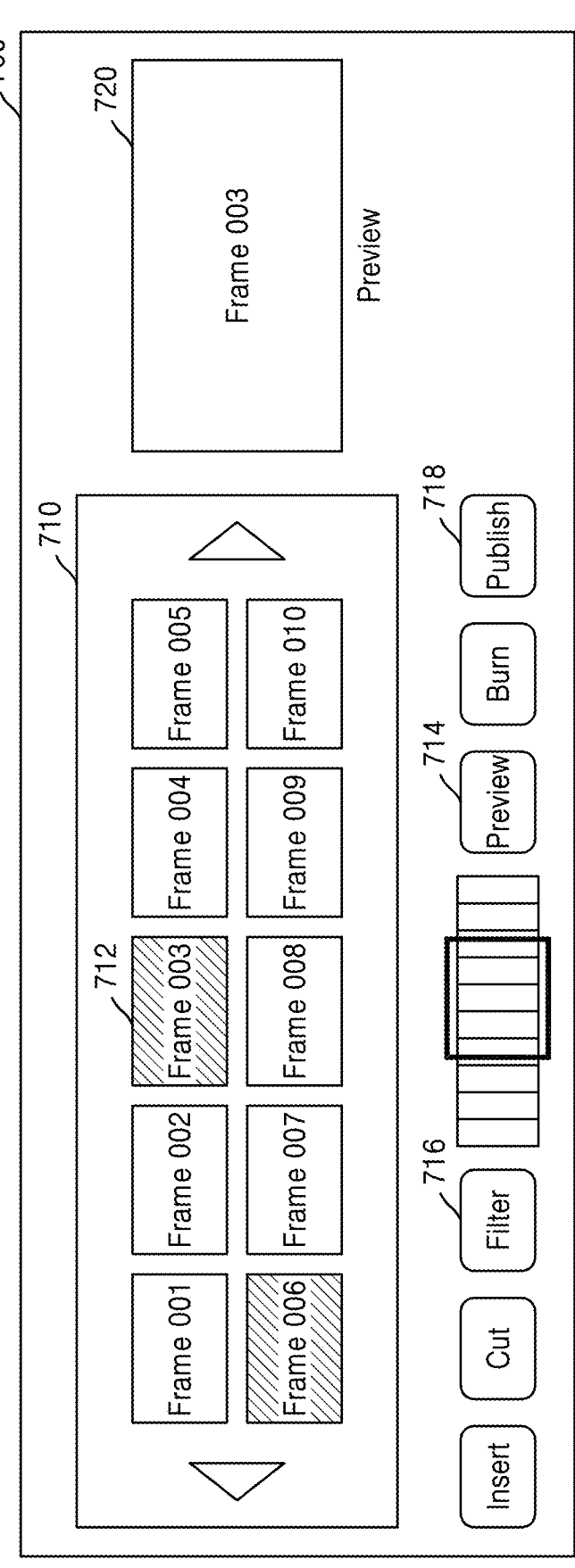
FIG. 7 is a diagram illustrating a user interface for removing sensitive information from video data according to an embodiment of the disclosure.

FIG. 7 is a diagram illustrating a user interface for removing sensitive information from video data according to an embodiment of the disclosure.

Referring to FIG. 7, video data may refer to a collection of reference images and motion vector and may include a plurality of frames. A processor (e.g., the processor of FIG. 3) may perform a process of removing the sensitive information on the video data. For example, the processor may generate at least one frame that does not include sensitive information by performing the process of removing the sensitive information on at least one frame of the plurality of frames. In an embodiment of the disclosure, the processor may generate video data in which the sensitive information is removed by replacing original frames including the sensitive information with frames that do not include the sensitive information. To this end, the one or more embodiments of the disclosure described with reference to FIGS. 1A to 1C, and 2 to 6 may be applied to at least one frame of the video data.

In an embodiment of the disclosure, when a first frame among a plurality of frames of first video data is determined as including sensitive information, the processor may generate a second frame by modifying an area related to the sensitive information in the first frame. When the generated second frame is determined as still including the sensitive information, the processor may iterate the sensitive information removal process. When the generated second frame is determined as no longer including the sensitive information, the processor may generate second video data including the second frame.

In an embodiment of the disclosure, when a request for the first video data or the second video of data is received, the processor may perform operations on the second video data according to the received request. For example, the request for the first video data or the second video data may include a request for sharing or storage of the first video data or the second video data. In this case, the second video data may be transmitted to other electronic device, server, or system and then shard or stored. The request for the first video data or the second video data may be received before detection of the sensitive information, before removal of the sensitive information, or after removal of the sensitive information.

In removing the sensitive information from the video data, the processor may provide a user interface for editing of the video data, that is, an editor 700. As shown in the editor 700 of FIG. 7, the processor may output a user interface including a plurality of icons to provide various functions regarding video data. The processor may output at least some frames 710 among a plurality of frames of video data on a display. For example, the processor may output on the display N frames (N is a natural number) included in a particular time section among the plurality of frames. Alternatively, the processor may output N frames which are arbitrarily selected from the plurality of frames. N frames output on the display may be arranged in chronological order; however, the disclosure is not limited thereto.

In an embodiment of the disclosure, among the plurality of frames, at least some frames which are determined as including sensitive information may be emphasized and output on the display. As illustrated in FIG. 7, among ten frames 710 output on the display, frames including the sensitive information may be emphasized. A user may recognize at first sight frames including the sensitive information by the emphasis mark. In the editor 700 of FIG. 7, a slash pattern is used as an emphasis mark; however, the disclosure is not limited thereto, and any shape recognizable by users may be used as the emphasis mark.

As shown in the editor 700 of FIG. 7, the processor may provide (or output) a preview image 720 for at least one of the output frames 710. For example, the processor may provide the preview image 720 for at least one of the frames including the sensitive information. For example, the processor may provide a frame 712 selected by a user among the plurality of output frames 710 as the preview image 720. In an embodiment of the disclosure, the processor may provide a frame in which an area related to sensitive information is marked as the preview image 720. Additionally or alternatively, the processor may provide a frame in which the sensitive information is removed as the preview image 720.

Referring to FIG. 7, when receiving a user input of selecting Frame 003 712 among the frames 710 and a user input of selecting an icon "Preview" 714, the processor may provide the preview image 720 for Frame 003 712. In an embodiment of the disclosure, when receiving a user input of selecting an icon "Filter" 716 included in the editor 700, the processor may perform the sensitive information removal process on Frame 003 712 and provide Frame 003 in which the sensitive information is removed. In an embodiment of the disclosure, when receiving a user input of selecting an icon "Publish" 718 included in the editor 700, the processor may generate and provide video data including Frame 003 in which the sensitive information is removed.

Additionally, the aforementioned one or more embodiments of the disclosure may be applied not only to the video data which has already generated and stored but also to video data which is being generated in real time. To this end, the processor may perform the sensitive information detection and removal process on frames being obtained in real time by video filming. Accordingly, video in which sensitive information is removed in real time may be sent out during live-streaming broadcasting.

The numbers assigned to the frames 710 output through the editor 700 of FIG. 7 are used simply to distinguish one frame from others, and are not intended to limit the order of the frames included in the video data. Accordingly, Frame 001 may not be the first frame of the video data. Frame 002 may not be a frame immediately after Frame 001. In addition, the one or more embodiments of the disclosure which are illustrated or described in FIG. 7 may be applied not only to video data including a plurality of frames but also to a plurality of image data which are unrelated to each other.

A non-transitory storage medium may be provided as a machine-readable storage medium. The non-transitory storage medium simply means that the medium is tangible and does not include signals (e.g., electromagnetic waves), and this term is not intended to distinguish semi-permanent storage of data in a storage medium from temporary storage of the same. For example, the non-transitory storage may include a buffer in which data is temporarily stored.

According to an embodiment of the disclosure, the method described in one or more embodiments of the disclosure may be included and provided in a computer program product. The computer program may be a commodity and be traded between a seller and a buyer. The computer program may be distributed in the form of a machine-readable storage medium (e.g., a compact disc read-only memory (CD-ROM)), or distributed (e.g., downloaded or uploaded) online through an application store or directly between two user devices (e.g., smartphones). In the case of online distribution, at least some of the computer program products (e.g., a downloadable application, or the like) may be at least temporarily stored in a storage medium readable by devices, such as a memory of a manufacturer server, an application store server, or a relay server or temporarily generated.

According to an embodiment of the disclosure, a method of removing sensitive information from image data by an electronic device includes obtaining first image data. In an embodiment of the disclosure, the method of removing sensitive information from image data by an electronic device includes determining whether the first image data includes at least one sensitive information by using a sensitive information detection model configured to detect sensitive information. In an embodiment of the disclosure, the method of removing sensitive information from image data by an electronic device includes, when the first image data is determined as including the at least one sensitive information, identifying a first area related to the at least one sensitive information in the first image data based on the first image data and the sensitive information detection model. In an embodiment of the disclosure, the method of removing sensitive information from image data by an electronic device includes generating second image data by modifying the first area by using an image reconstruction model for image reconstruction.

According to an embodiment of the disclosure, the electronic device may provide the user with image data in which sensitive information, such as personal information, disease information, emotion information, or the like, is removed. Accordingly, the user may share the image data in which the sensitive information is removed on an SNS page or store the same in a cloud storage space. For example, other users may not be able to extract or recognize the sensitive information of the user from the image data of the user obtained from the SNS page or cloud storage space.

In an embodiment of the disclosure, the generating of the second image data may include masking the identified first area in the first image data. In an embodiment of the disclosure, the generating of the second image data may include generating the second image data based on the first image data in which the first area is masked by using the image reconstruction model.

When noise is added to an area related to sensitive information or data of the area related to sensitive information is replaced with data unrelated to the first image data, quality of image may decline. However, according to an embodiment of the disclosure, by reconstructing data of the area related to the sensitive information by suing the image reconstruction model, the electronic device may generate natural and flawless data. For example, when a mouth area of other reference images is added to the mouth area related to the sensitive information in the image data, or noise is added to the mouth area, the image data may be overall unnatural. On the contrary, the image data in which the mouth area is reconstructed by suing the image reconstruction model according to an embodiment of the disclosure may be natural and flawless.

In an embodiment of the disclosure, the identifying of the first area may include, when the first image data is determined as including the at least one sensitive information, extracting at least one feature point related to the at least one sensitive information from the first image data based on the first image data and the sensitive information detection model. In an embodiment of the disclosure, the first area may be determined based on the extracted at least one feature point.

According to an embodiment of the disclosure, the electronic device may identify sensitive information which is not shown as an object by extracting feature points related to sensitive information scattered over image data and filter the identified sensitive information from the image data. According to an embodiment of the disclosure, the electronic device may reduce loss of original image data and improve quality of image data in which the sensitive information is filtered, by removing the sensitive information on a feature-point basis instead of a wide area.

In an embodiment of the disclosure, the method of removing sensitive information from image data by an electronic device may include outputting at least one of contents of the at least one sensitive information or the first image data in which the first area is marked. According to an embodiment of the disclosure, a user may visually recognize an area related to the sensitive information in the image data of the user.

In an embodiment of the disclosure, the method of removing sensitive information from image data by an electronic device may include receiving a request for removal of the at least one sensitive information from the first image data. In an embodiment of the disclosure, the generating of second image data by modifying the first area may include generating the second image data in response to a request for removal of the at least one sensitive information. According to an embodiment of the disclosure, a user may directly select at least one of sensitive information to be removed from the image data or an area related to the sensitive information.

In an embodiment of the disclosure, the method of removing sensitive information from image data by an electronic device may include determining whether the second image data includes at least one sensitive information by using the sensitive information detection model. In an embodiment of the disclosure, the method of removing sensitive information from image data by an electronic device may include, when the second image data is determined as including the at least one sensitive information, identifying a second area related to the at least one sensitive information in the second image data based on the second image data and the sensitive information detection model. In an embodiment of the disclosure, the method of removing sensitive information from image data by an electronic device may include generating third image data by modifying the second area by using the image reconstruction model. According to an embodiment of the disclosure, the electronic device may provide image data from which no sensitive information is detected by iterating the sensitive information removal process until the sensitive information is not detected from the image data.

In an embodiment of the disclosure, the method of removing sensitive information from image data by an electronic device may include receiving a request for sharing or storage of the first image data or the second image data. In an embodiment of the disclosure, the method of removing sensitive information from image data by an electronic device may include determining whether the second image data includes at least one sensitive information by using the sensitive information detection model. In an embodiment of the disclosure, the method of removing sensitive information from image data by an electronic device may include, when the second image data is determined as not including the at least one sensitive information, performing sharing or storage of the second image data in response to the request for sharing or storage.

According to an embodiment of the disclosure, the electronic device may share or store the image data in which the sensitive information is removed, that is, the image data from which no sensitive information is detected in a space accessible by other users. The space accessible by other users may include not only a space which allows access of other users but also a space which does not allow access of other users but is technically accessible.

In an embodiment of the disclosure, the first image data may be a first frame included in a plurality of frames constituting the first video data. In an embodiment of the disclosure, the second image data may be a second frame generated by modifying the first area by using the image reconstruction model.

In an embodiment of the disclosure, among the plurality of frames, at least some frames which are determined as including sensitive information may be emphasized and output on the display. In an embodiment of the disclosure, the at least some frames may include the first frame. According to an embodiment of the disclosure, a user may generate video data in which sensitive information is removed by using a vide editor.

In an embodiment of the disclosure, the method of removing sensitive information from image data by an electronic device may include determining whether the second frame includes at least one sensitive information by using the sensitive information detection model. In an embodiment of the disclosure, the method of removing sensitive information from image data by an electronic device may include, when the second frame is determined as including the at least one sensitive information, identifying a second area related to the at least one sensitive information in the second frame based on the second frame and the sensitive information detection model. In an embodiment of the disclosure, the method of removing sensitive information from image data by an electronic device may include generating a third frame by using the image reconstruction model.

In an embodiment of the disclosure, the method of removing sensitive information from image data by an electronic device may include determining whether the second frame includes at least one sensitive information by using the sensitive information detection model. In an embodiment of the disclosure, the method of removing sensitive information from image data by an electronic device may include, when the second frame is determined as not including the at least one sensitive information, generating second video data including the second frame.

In an embodiment of the disclosure, the method of removing sensitive information from image data by an electronic device may include receiving a request for sharing or storage of the first video data or the second video data. In an embodiment of the disclosure, the method of removing sensitive information from image data by an electronic device may include performing sharing or storage of the second video data in response to the request for sharing or storage. According to an embodiment of the disclosure, in a public and formal situation accompanied with video filming or real time streaming, a video in which negative emotions or health conditions of a user are filtered may be provided.

According to an embodiment of the disclosure, an electronic device configured to remove sensitive information from image data includes a memory storing at least one instruction, and at least one processor configured to execute the at least one instruction stored in the memory. In an embodiment of the disclosure, by executing the at least one instruction, the at least one processor may obtain first image data. In an embodiment of the disclosure, by executing the at least one instruction, the at least one processor may determine whether the first image data includes at least one sensitive information by using a sensitive information detection model configured to detect sensitive information. In an embodiment of the disclosure, by executing the at least one instruction, the at least one processor may, when the first image data is determined as including the at least one sensitive information, identify a first area related to the at least one sensitive information in the first image data based on the first image data and the sensitive information detection model. In an embodiment of the disclosure, by executing the at least one instruction, the at least one processor may generate second image data by modifying the first area by using an image reconstruction model for image reconstruction.

In an embodiment of the disclosure, by executing the at least one instruction, the at least one processor may mask the identified first area in the first image data. In an embodiment of the disclosure, by executing the at least one instruction, the at least one processor may generate the second image data based on the first image data in which the first area is masked by using the image reconstruction model.

In an embodiment of the disclosure, by executing the at least one instruction, the at least one processor may, when the first image data is determined as including the at least one sensitive information, extract at least one feature point related to the at least one sensitive information from the first image data based on the first image data and the sensitive information detection model. In an embodiment of the disclosure, the first area may be determined based on the extracted at least one feature point.

In an embodiment of the disclosure, by executing the at least one instruction, the at least one processor may output at least one of contents of the at least one sensitive information or the first image data in which the first area is marked.

In an embodiment of the disclosure, by executing the at least one instruction, the at least one processor may receive a request for removal of the at least one sensitive information from the first image data. In an embodiment of the disclosure, by executing the at least one instruction, the at least one processor may generate the second image data in response to the request for removal of the at least one sensitive information.

In an embodiment of the disclosure, by executing the at least one instruction, the at least one processor may determine whether the second image data includes at least one sensitive information by using the sensitive information detection model. In an embodiment of the disclosure, by executing the at least one instruction, the at least one processor may, when the second image data is determined as including the at least one sensitive information, identify a second area related to the at least one sensitive information in the second image data based on the second image data and the sensitive information detection model. In an embodiment of the disclosure, by executing the at least one instruction, the at least one processor may generate third image data by modifying the second area by using the image reconstruction model.

In an embodiment of the disclosure, by executing the at least one instruction, the at least one processor may receive a request for sharing or storage of the first image data or the second image data. In an embodiment of the disclosure, by executing the at least one instruction, the at least one processor may determine whether the second image data includes at least one sensitive information by using the sensitive information detection model. In an embodiment of the disclosure, by executing the at least one instruction, the at least one processor may, when the second image data is determined as not including the at least one sensitive information, perform sharing or storage of the second image data in response to the request for sharing or storage.

In an embodiment of the disclosure, by executing the at least one instruction, the at least one processor may determine whether the second frame includes at least one sensitive information by using the sensitive information detection model. In an embodiment of the disclosure, by executing the at least one instruction, the at least one processor may, when the second frame is determined as including the at least one sensitive information, identify a second area related to the at least one sensitive information in the second frame based on the second frame and the sensitive information detection model. In an embodiment of the disclosure, by executing the at least one instruction, the at least one processor may generate a third frame by modifying the second area by using the image reconstruction model.

In an embodiment of the disclosure, by executing the at least one instruction, the at least one processor may determine whether the second frame includes at least one sensitive information by using the sensitive information detection model. In an embodiment of the disclosure, by executing the at least one instruction, the at least one processor may, when the second frame is determined as not including the at least one sensitive information, generate second video data including the second frame.

In an embodiment of the disclosure, by executing the at least one instruction, the at least one processor may receive a request for sharing or storage of the first video data or the second video data. In an embodiment of the disclosure, by executing the at least one instruction, the at least one processor may perform sharing or storage of the second video data in response to the request for sharing or storage.

According to an embodiment of the disclosure, a program for performing the method of removing sensitive information from image data by an electronic device in a computer may be recorded on a computer-readable recording medium.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by an electronic device, of removing sensitive information from image data, the method comprising:
   obtaining first image data;
   determining whether the first image data includes at least one piece of sensitive information, by using a sensitive information detection model configured to detect sensitive information, wherein the sensitive information comprises disease information;

in case that the first image data is determined as including the at least one piece of sensitive information, identifying a first area related to the at least one piece of sensitive information in the first image data based on the first image data and the at least one piece of sensitive information; and generating second image data based on data in the first area reconstructed based on an image reconstruction model, and wherein the identifying of the first area comprises:

providing the first image data and the at least one piece of sensitive information to an explainable artificial intelligence model to identify at least one feature point that contributes to detection of the at least one piece of sensitive information from the first image data, and wherein the first area is determined based on the identified at least one feature point.

2. The method of claim 1, wherein the generating of the second image data comprises:

masking the first area in the first image data; and generating the second image data based on the first image data in which the first area is masked, by using the image reconstruction model.

3. The method of claim 1, further comprising:

outputting at least one of contents of the at least one piece of sensitive information or the first image data in which the first area is marked.

4. The method of claim 1, further comprising:

receiving a request for removal of the at least one piece of sensitive information from the first image data, wherein the generating of the second image data comprises generating the second image data in response to the request for removal of the at least one piece of sensitive information.

5. The method of claim 1, further comprising:

determining whether the second image data includes the at least one piece of sensitive information by using the sensitive information detection model;

when the second image data is determined as including the at least one piece of sensitive information, identifying a second area related to the at least one piece of sensitive information in the second image data based on the second image data and the sensitive information detection model; and generating third image data by modifying the second area by using the image reconstruction model.

6. The method of claim 1, further comprising:

receiving a request for sharing or storage of the first image data or the second image data;

determining whether the second image data includes the at least one piece of sensitive information by using the sensitive information detection model; and when the second image data is determined as not including the at least one piece of sensitive information, performing sharing or storage of the second image data based on the request for sharing or storage.

7. The method of claim 1, wherein the first image data is a first frame included in a plurality of frames constituting first video data, and wherein the second image data is a second frame generated by modifying the first area by using the image reconstruction model.

8. The method of claim 7, wherein, among the plurality of frames, at least some frames which are determined as including sensitive information are emphasized, by using an emphasis mark to indicate the at least some frames, and output on a display, and wherein the at least some frames include the first frame.

9. The method of claim 7, further comprising:

determining whether the second frame includes the at least one piece of sensitive information by using the sensitive information detection model;

when the second frame is determined as including the at least one piece of sensitive information, identifying a second area related to the at least one piece of sensitive information in the second frame based on the second frame and the sensitive information detection model; and generating a third frame by modifying the second area by using the image reconstruction model.

10. The method of claim 7, further comprising:

determining whether the second frame includes the at least one piece of sensitive information, by using the sensitive information detection model; and when the second frame is determined as not including the at least one piece of sensitive information, generating second video data including the second frame.

11. The method of claim 10, further comprising:

receiving a request for sharing or storage of the first video data or the second video data; and performing sharing or storage of the second video data based on the request for sharing or storage.

12. An electronic device configured to remove sensitive information from image data, the electronic device comprising:

memory, comprising one or more storage media, storing at least one instruction; and at least one processor communicatively coupled to the memory and configured to execute the at least one instruction stored in the memory, wherein, by executing the at least one instruction, the at least one processor is further configured to:

obtain first image data, determine whether the first image data includes at least one piece of sensitive information, by using a sensitive information detection model configured to detect sensitive information, wherein the sensitive information comprises disease information, in case that the first image data is determined as including the at least one piece of sensitive information, identify a first area related to the at least one piece of sensitive information in the first image data based on the first image data and the at least one piece of sensitive information, and generate second image data based on data in the first area reconstructed based on an image reconstruction model, and wherein, by executing the at least one instruction, the at least one processor is further configured to in case that the first image data is determined as including the at least one piece of sensitive information, provide the first image data and the at least one piece of sensitive information to an explainable artificial intelligence model to identify at least one feature point that contributes to detection of the at least one piece of sensitive information from the first image data, and wherein the first area is determined based on the identified at least one feature point.

13. The electronic device of claim 12, wherein, by executing the at least one instruction, the at least one processor is further configured to:

mask the first area in the first image data; and generate the second image data based on the first image data in which the first area is masked, by using the image reconstruction model.

14. The electronic device of claim 12, wherein, by executing the at least one instruction, the at least one processor is further configured to output at least one of contents of the at least one piece of sensitive information or the first image data in which the first area is marked.

15. The electronic device of claim 12, wherein, by executing the at least one instruction, the at least one processor is further configured to:

receive a request for removal of the at least one piece of sensitive information from the first image data; and generate the second image data based on the request for removal of the at least one piece of sensitive information.

16. The electronic device of claim 12, wherein, by executing the at least one instruction, the at least one processor is further configured to:

determine whether the second image data includes the at least one piece of sensitive information by using the sensitive information detection model;

when the second image data is determined as including the at least one piece of sensitive information, identify a second area related to the at least one piece of sensitive information in the second image data based on the second image data and the sensitive information detection model; and generate third image data by modifying the second area by using the image reconstruction model.

17. The electronic device of claim 12, wherein, by executing the at least one instruction, the at least one processor is further configured to:

receive a request for sharing or storage of the first image data or the second image data;

determine whether the second image data includes the at least one piece of sensitive information by using the sensitive information detection model; and when the second image data is determined as not including the at least one piece of sensitive information, perform sharing or storage of the second image data based on the request for sharing or storage.

18. At least one non-transitory computer-readable recording medium having recorded thereon a program including computer-executable instructions that, when executed by one or more processors of an electronic device, cause the electronic device to perform operations, the operations comprising:

obtaining first image data;

determining whether the first image data includes at least one piece of sensitive information, by using a sensitive information detection model configured to detect sensitive information, wherein the sensitive information comprises disease information;

in case that the first image data is determined as including the at least one piece of sensitive information, identifying a first area related to the at least one piece of sensitive information in the first image data based on the first image data and the at least one piece of sensitive information; and generating second image data based on data in the first area reconstructed based on an image reconstruction model, and wherein the operations further comprises:

in case that the first image data is determined as including the at least one piece of sensitive information, providing the first image data and the at least one piece of sensitive information to an explainable artificial intelligence model to identify at least one feature point that contributes to detection of the at least one piece of sensitive information from the first image data, and wherein the first area is determined based on the identified at least one feature point.

* * * * *